US005293397A

United States Patent [19]

Veligdan

[11] Patent Number: 5,293,397

[45] Date of Patent: Mar. 8, 1994

[54] MEANS AND METHOD FOR CHARACTERIZING HIGH POWER, ULTRA SHORT LASER PULSES IN A REAL TIME, ON LINE MANNER

[75] Inventor: James T. Veligdan, Manorville, N.Y.

[73] Assignee: Associated Universities, Inc., Washington, D.C.

[21] Appl. No.: 980,710

[22] Filed: Nov. 24, 1992

[51] Int. Cl.[5] .......... H01S 3/10

[52] U.S. Cl. .......... 372/25; 372/30; 359/299

[58] Field of Search .......... 372/18-20, 372/25, 54, 30, 32, 38, 10; 359/299

[56] References Cited

U.S. PATENT DOCUMENTS

| | | | |
|---|---|---|---|
| 4,190,811 | 2/1980 | Alcock et al. | 372/25 |
| 4,590,598 | 5/1986 | O'Harra, II | 372/25 X |
| 4,601,037 | 7/1986 | McDonald | 372/25 |
| 4,612,641 | 9/1986 | Corkum | 372/54 X |
| 4,888,776 | 12/1989 | Dolezal et al. | 372/69 X |
| 4,930,901 | 6/1990 | Johnson et al. | 372/25 X |

OTHER PUBLICATIONS

Corkum, "Amplification of Picosecond 10 μm Pulses in Multi-atmosphere $CO_2$ Lasers", J. of Quantum Electronics, vol. QE-21 No. 3, Mar. 1985.

Salin et al., "Single-shot Measurement of a 52-fs Pulse", Applied Optics, vol. 25, No. 21, Nov. 1987.

BNL 45802, Pogorelsky et al., "Spatial Dynamics of Picosecond $CO_2$ Laser Pulses Produced by Optical Switching in Ge", presented at SPIE OE/LASE 1991, Los Angeles, Calif., Jan. 20-25, 1991.

Wyatt et al., "Versatile Single-Shot Background-Free Pulse Duration Measurement Technique, for Pulses of Subnanosecond to Picosecond Duration", Appl. Phys. 25, 297-301, 1981.

*Primary Examiner*—Akm E. Ullah

*Attorney, Agent, or Firm*—Margaret C. Bogosian

[57] ABSTRACT

An ultra short (<10 ps), high power laser pulse is temporally characterized by a system that uses a physical measurement of a wavefront that has been altered in a known manner. The system includes a first reflection switch to remove a portion of a pulse from a beam of pulses, then includes a second reflection switch, operating in a mode that is opposite to the first reflection switch, to slice off a portion of that removed portion. The sliced portion is then directed to a measuring device for physical measurement. The two reflection switches are arranged with respect to each other and with respect to the beam of ultra short pulses such that physical measurement of the sliced portion is related to the temporal measurement of the ultra short pulse by a geometric or trigonometric relationship. The reflection switches are operated by a control pulse that is directed to impinge on each of the reflection switches at a 90° angle of incidence.

19 Claims, 5 Drawing Sheets

MEANS AND METHOD FOR CHARACTERIZING HIGH POWER, ULTRA SHORT LASER PULSES IN A REAL TIME, ON LINE MANNER

This invention was made with Government support under contract number DE-AC02-76CH00016, between the U.S. Department of Energy and Associated Universities, Inc. The Government has certain rights in the invention.

TECHNICAL FIELD OF THE INVENTION

The present invention relates to the general art of measuring and testing, and to the particular field of characterizing high power, ultra short laser pulses.

BACKGROUND OF THE INVENTION

Development of picosecond (ps) and femtosecond (fs) optical pulses has opened many areas of physics, chemistry and biology to experimental investigation. Lasers have also been tools for electron acceleration, and ultra short (<10 ps), high power laser pulses have found many uses in the just-mentioned fields.

However, in order to fully utilize such pulses, they must be temporally characterized to a high degree of accuracy. In the past, this characterization has been by optical autocorrelation, see "Single-shot measurement of a 52-fs pulse," by F. Salin, et al., published in *Applied Optics*, volume 26, No. 21, Nov. 1, 1987, pp. 4528–4531, "Versatile Single-Shot Background-Free Pulse Duration Measurement Technique, for Pulses of Subnanosecond to Picosecond Duration," by R. Wyatt and E. B. Marinero, published in *Applied Physics*, volume 25, 297–301 (1981). Other techniques that have been used include the use of special cameras and the like.

Known techniques have the disadvantage of being time-intensive, and often require data points from fifty or more separate laser pulses in order to map out a pulse profile. These techniques generally cannot be carried out in a real-time, on-line manner. Still further, these techniques often cannot be used to characterize every pulse in a monitored system.

Still further, the high energy of these pulses can make measurement difficult since the pulses may tend to degrade any measuring device used.

Yet a further means for measuring sub-nanosecond laser pulses can include a reflection switch used as a sampling gate. This means includes two sampling gates. Pulses are propagated past one of the sampling gates, and that gate is altered until a pulse is intercepted by the gate. Then, further pulses are propagated past the other sampling gate until a pulse is intercepted by that second sampling gate. The spacing between the two sampling gates is measured, and that spacing represents the width of the pulse. As can be understood from the foregoing description, a pulselength measuring technique using this sampling gate means is tedious and indirect.

Therefore, there is a need for an improved means and a method for measuring ultra short, high energy laser pulses. There is a further need for a means and a method for measuring such ultra short, high energy laser pulses in an on-line, real time manner, which means and method provides the capability of measuring every pulse in a monitored system.

OBJECTS OF THE INVENTION

It is a main object of the present invention to characterize high power, ultra short laser pulses.

It is another object to characterize high power, ultra short laser pulses in an on-line, real time manner.

It is another object to provide a means and a method for efficiently characterizing a pulse in a monitored system of high power, ultra short laser pulses.

It is another object to provide a means and a method for characterizing high power, ultra short laser pulses in a manner that does not subject a measuring device to undue exposure to such laser pulses.

SUMMARY OF THE INVENTION

These, and other, objects are achieved by a system that transforms a temporal pulselength into a spatial pulselength, the length of which can be physically read directly on a measuring means. In this manner, short pulse pulselengths can be measured in a direct manner. The system includes an optical arrangement of reflection switches to distort a pulse from a wavefront of ultra short, high power laser pulses in a known manner and then to physically measure the length of that distorted pulse to determine the temporal pulselength of the unaltered pulses in the wavefront.

Specifically, the system uses an arrangement of reflection switches to cut a portion of an ultra short, high power laser pulse out of a beam of such pulses, then to also cut that portion to define a further slice, and then to measure a physical dimension of that further slice. The reflection/cutting skews the removed portion of the pulse with respect to the unremoved portions. The cutting and slice forming are performed using reflection switches that are operated by laser pulses generated by a control laser. The reflection switches are timed to operate according to the average length of the pulse being characterized and are oriented with respect to the laser pulses and with respect to the control laser so the pulse portions leaving the switches are skewed in a predetermined manner. The system exposes a measuring device being used to determine a physical dimension of the pulses to only a very small part of the laser pulse, yet the skewed nature of the pulses permits making a meaningful physical measurement of the pulse. A reflection switch is capable of rapidly changing from a transmitter to a reflector, and reflection switches have been used to compress infrared pulses in systems such as disclosed in U.S. Pat. No. 4,612,641. It should be understood that when a reflection switch is changed to a reflector it remains in the reflective state for 50 nanoseconds or longer.

The system of the present invention includes pairs of reflection switches that are sequentially operated to transform the temporal pulselength of a pulse being characterized into a spatial pulselength of very short duration. Since a spatial measurement of only a small portion of the pulse is used, the measuring means need not be exposed to the pulse for the full temporal length of the pulse being measured, but only to so much of the pulse as is necessary to record the spatial length of a portion of the pulse. The customizing of the pulse is thus set so the duration of the pulse incident on the measuring means is short enough so it can be measured without exposing the measuring means to the full power of the pulse being characterized for the full temporal length of the pulse being characterized. The selection and orientation of the measured pulse is effected so the full temporal pulselength is related to the spatial pulselength of the pulse being measured by a known geometric or trigonometric relationship.

More specifically, the system uses a first reflection switch to remove a portion of a pulse from its projection path, then includes a second reflection switch operated in a manner that is opposite to the first switch, to slice off a portion of that removed portion, which sliced portion is then directed along its propagation path to a measuring device for physical measurement. The two switches are arranged with respect to each other and with respect to the beam of pulses such that the length of the sliced portion is related to the spatial pulselength of the full pulse by a geometric or trigonometric relationship.

A specific example of the system includes a first reflection switch operating to select a portion of a pulse by transmitting the non-selected portion of the pulse and reflecting the portion being selected; while the second reflection switch operates in a mode opposite to the first switch to transmit the portion of the pulse being selected at the second switch and to reflect the non-selected portion. The operation of the reflection switches is controlled by a control laser generating control pulses that are directed to impinge on both the first and second switches at about a 90° angle of incidence, and that are delayed to operate the second switch in sequence with the first switch to effect the necessary customizing of the pulse selected by the first switch. The directing and delaying of the control pulses is effected in the preferred form of the system by optical elements that include a mirror, and can include beam splitters. Other optical elements can be included to further condition the control pulses. The preferred form of the system includes control pulses generated by an Nd:YAG laser (1.06 μm wavelength) directed to sequentially impinge on reflection switches that include germanium plates. The pulse being characterized may preferably be generated by a $CO_2$ laser operating at about 10 μm wavelength.

BRIEF DESCRIPTION OF THE DRAWING FIGURES

In the drawings the sizes and arrangements of component parts are not to scale.

DETAILED DESCRIPTION OF PREFERRED EMBODIMENTS

As above discussed, the present invention uses reflective switching to characterize high power, ultra short laser pulses (i.e. pulses $<$ 10 ps in length) in an on-line, real time manner so that the pulses in a monitored beam can be efficiently characterized in a manner that will not subject a spatial measuring device to the full laser pulse during the measurement process. The invention is particularly useful to accurately measure the length of ultrashort pulses that are only a few picoseconds, i.e. one to three picoseconds long. One form of the system uses two reflection switches with the first switch cutting out a portion of the ultra short pulse and reflecting that portion, while the second switch subsequently slices a further portion of the reflected pulse and transmits that sliced portion to a spatial measuring means. The reflection switches are activated by a control laser pulse that is directed to impinge on the reflection switches at about a 90° angle of incidence, and that is controlled to be delayed to impinge on the switches in timed relation to a first pulse the length of which is to be measured, and in timed relation to the reflected pulse portion. This is done to divide a propagated pulse reaching the first switch so that the reflected and subsequently sliced portion of that pulse can be measured. That sliced portion has a known geometric or trigonometric relationship with the full pulselength of the ultra short propagated pulse being characterized. The sliced pulse is preferably kept as short as possible so the measuring means will not be unduly exposed to the laser pulse while still being exposed sufficiently to permit accurate spatial measurement of the sliced pulse. The spatial dimension of the sliced pulse is related to the temporal pulselength of the characterized ultra short pulse by the known geometric or trigonometric relationship and the speed of light. The above-described relative modes of operation of the two switches can be reversed, if desired, as will be more fully explained below with reference to FIGS. 5 and 6.

Figure 1:
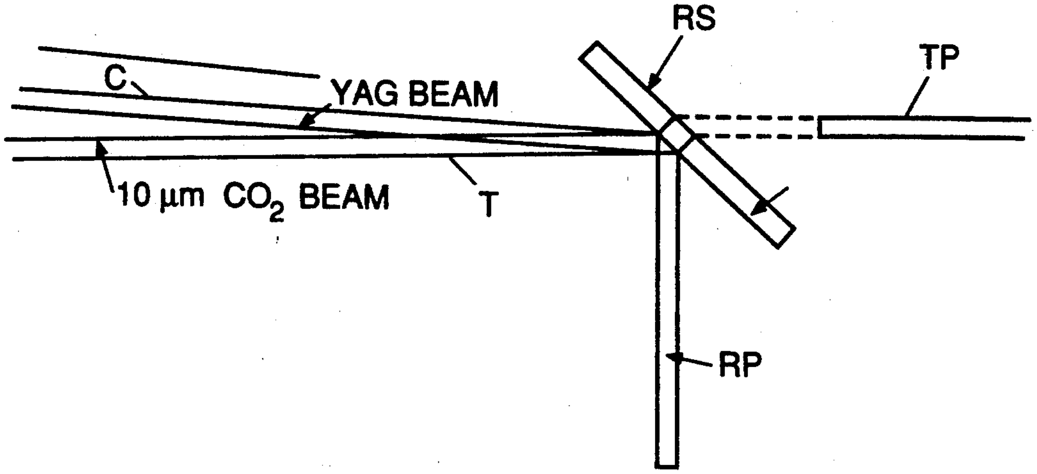
Fig. 1 (Prior Art)
FIG. 1 is a schematic illustrating the operation of a prior art reflection switch.

In order to describe some of the basic principles used in practicing the invention, there is shown in FIG. 1 a reflection switch RS of a type generally used in the prior art. The operation of such a reflection switch RS is based on modulating the reflective and transmissive properties of its semiconductor material by optically controlling the free charge carrier density of that semiconductor. When a short-wavelength picosecond control laser pulse with photon energy above the band gap of the semiconductor is incident on the switch, its normally transmissive surface is transformed into a highly reflective surface by rapidly creating a highly reflective subsurface of electron-hole plasma in the semiconductor. In this manner, a semiconductor, such as germanium (Ge), that is normally transparent to certain radiation, becomes reflective to such radiation. This phenomenon will be referred to herein as "transient surface metallization."

As used in the prior art, reflection switch RS typically has a $CO_2$ laser beam of 10 μm wavelength radiation made to impinge thereon, in a test beam T, and radiation from an Nd:YAG laser (1.06 μm wavelength) is also made incident thereon as a control pulse C. When the test beam above is incident on the reflection switch, the switch is transparent and transmits beam TP. However, as soon as the control pulse C is incident on the switch, the switch undergoes transient surface metallization and becomes a reflector, so it then reflects a beam RP, at an angle determined by the angle of incidence of beam T, on the reflection switch. As used in the prior art, the control beam and the test beam are generally coaxial, or very nearly coaxial, as they approach the switch in order to preserve the wavefront integrity of the reflected light RP. With the control pulse and test beam T being nearly collinear, the control pulse and the test beam impinge on the reflection switch nearly simultaneously. Any portion of the test beam that is reflected by such a prior art switch will have a shape whereby the temporal dimension of one test beam pulse versus another will not be determinable using physical measurements of the two beams. Another important feature of such reflection switches (RS) is that they can be rapidly switched to a reflective mode by the incidence of a control pulse (C) that is only a few picoseconds in duration; however, and a switch (RS) typically maintains its reflective mode for 50 nanoseconds or more.

Figure 2:
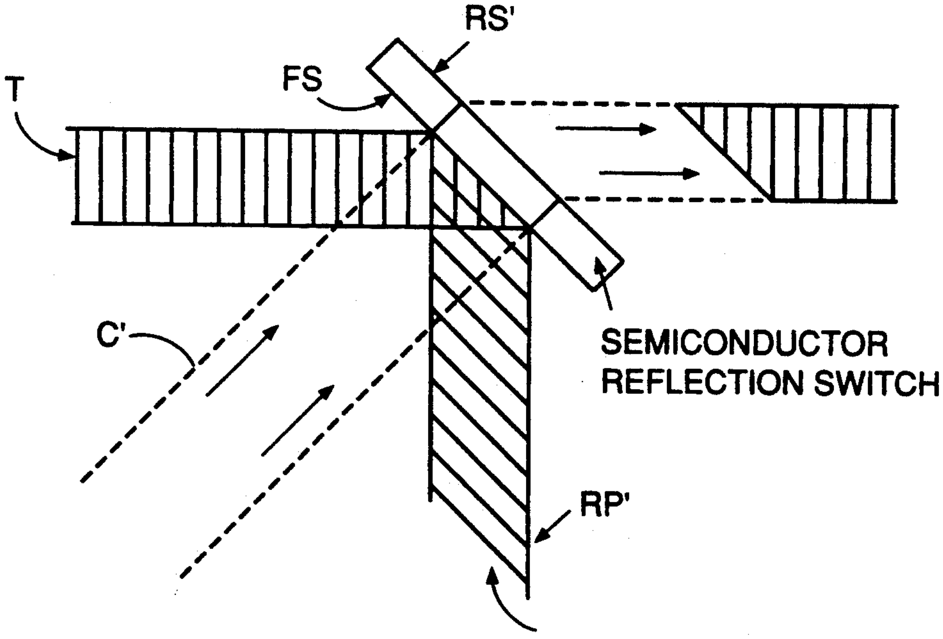
FIG. 2 is a schematic illustrating the operation of a reflection switch as used in the system embodying the present invention in which a propagated wavefront is distorted in a known manner.

A first reflection switch is used in the apparatus means and method of the system of the present invention in a manner that is modified from the type of use shown in FIG. 1. This modified application of a reflection switch is indicated in FIG. 2. A test beam T is shown incident on a reflection switch RS', similar to the manner shown in FIG. 1 for beam T. However, a control pulse C' is directed about perpendicularly to the front surface FS of the switch thereby allowing the entire exposed area of the semiconductor switch to become a reflector all at essentially the same time. It is important in understanding the high resolution measuring capability of the present invention to understand that to the extent control pulse C' impinges on surface FS at an angle less than 90° thereto, there will be a resultant distortion in the leading edge of the reflected pulse RP'. Such distortion would diminish the accuracy of the spatial measurement of a sliced portion of that pulse RP', as will be more fully explained below with reference to FIG. 3. The perpendicular orientation of the control pulse with respect to the reflection switch distorts the wavefront to cause the reflected portion of the beam to be skewed whereby according to the invention the temporal dimension of one test beam pulse can be distinguished from the temporal dimension of pulses in another test beam, as is explained below.

In the preferred form of the invention, the reflection switches are each one-plate, polished, polycrystalline n-type germanium semiconductor slabs fixed on 0.3 arc-sec resolution rotary stages, while the test beam that is to be characterized is generated by a $CO_2$ laser having a $CO_2$ oscillator and amplifier and having a wavelength of 10 $\mu$m. A switch-actuating control pulse is generated by an Nd:YAG laser (at 1.06 $\mu$m wavelength), and has a characteristic pulse fluence of $\approx 1$ mJ/cm$^2$ (millijoules/square centimeter). The density of excess free charge carriers created in the Ge switches is more than $2\times10^{19}$/cm$^3$, which is sufficient to "metallize" the Ge so that it switches from a window to a highly reflective mirror. The control pulse has a duration of approximately 1 picosecond, but the mirror may last for 50 nanoseconds or more after the control pulse initiates the reflective mode. The Nd:YAG laser used in this embodiment is Coherent Model 76S (with pulse compression fiber), while the preferred $Co_2$ laser is a Lumonics Model TEA-850. As will occur to those skilled in the art, based on the teaching of this disclosure, other forms of switches may require other control lasers. Therefore, the disclosure of particular wavelengths herein is not intended to be limiting.

Figure 3:
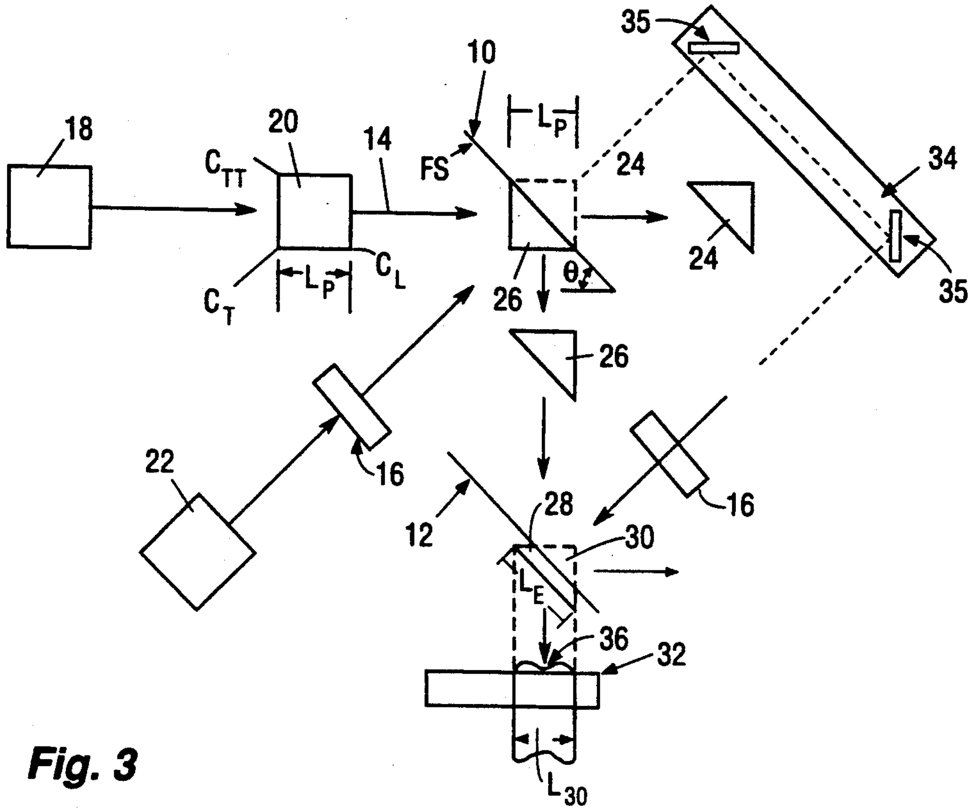
FIG. 3 is a schematic illustrating one form of the apparatus means and method of the system of the present invention, and showing a mode of operation for measurement of the longest pulselength that can be characterized with this form of the system.

As shown in FIG. 3, the system of the present invention utilizes two spaced apart reflection switches 10 and 12, with the first reflection switch, switch 10, being oriented to have a test beam 14 including a pulse 20 propagated to be incident thereon at an angle $\theta$ relative to the surface FS of the switch, and to have a control pulse 16 projected to be incident thereon at about a 90° angle with respect to the surface of switch 10. The test beam is generated by a first laser 18 that generates a beam 14 of short laser pulses, one of which is schematically shown as a pulse 20 having a pulselength $L_p$ in the order of 10 $\mu$m, corresponding to a temporal duration of about 30 picoseconds. Of course, switch 10 can be activated to a reflective mode by a control pulse 16 that impinges on it at an angle other than 90 degrees, as is explained above with references to FIG. 1; however, to achieve high resolution of spatial pulse length measurement with the present invention the control pulse should impinge on switch 10 at essentially an angle of 90 degrees to its reflective surface. It should be recognized that in alternative applications it may be desirable to have the control pulse impinge on the surface at some other angle than 90 degrees thereto. In such alternative cases it will be seen that the reflective surface of switch 10 will not be simultaneously switched to its reflective mode over the full area impinged on by the pulse 20, but rather will first be illuminated only in the area impinged on by the leading edge of the control pulse 16, then will be illuminated progressively in the areas subsequently impinged upon by the control pulse 16 until the trailing corner of the leading face of pulse 16 finally impinges on switch 10. For example, if control pulse 16 impinged on switch 10 at an angle of 80 degrees thereto, instead of 90 degrees thereto, i.e. a differential of 10 degrees from the preferred 90 degree angle of impingement, there should be an applied correction factor of 10 degrees before the reflected pulse portion 26 is used to characterize the spatial pulse length of pulse 20. Such a correction factor can be applied by arranging the reflective surfaces of switches 10 and 12 so that rather than being parallel to one another they are positioned so that they are out of parallel by 10 degrees, in a direction such that the 10 degree skewing of the leading surface of reflected pulse 26 caused by the progressive illumination of switch 10 is counteracted and effectively canceled thereby to maintain a high resolution of spatial pulse length measurement.

To further describe the principles of the invention it should be understood that pulse 20 is a pulse selected from the pulse beam 14, so pulse 20 can be temporally characterized by the system of the present invention in an on-line, real time manner. The control pulse 16 is generated by a control laser 22 having a wavelength in the order of 1.06 $\mu$m, or shorter, and the preferred characteristics discussed above for this embodiment.

The control laser is controlled in the embodiment of the invention illustrated in FIG. 3 so that a control pulse 16 is made to impinge incident on first switch 10 when one ultra short pulse 20 that is to be measured is just one-half of its length through that switch. When the control pulse is incident on switch 10 at 90 degrees thereto, the switch 10 changes from being transmissive to the ultra short laser pulse 20 to being reflective of that pulse. When the switch thus changes from a window to a mirror, the ultra short pulse is cut in half thus being separated into a transmitted portion 24 and a reflected portion 26. Portion 26 is deflected with respect to the propagation path of the transmitted portion 24 of pulses in test beam 14, and is reflected away from the switch according to the usual laws of reflection, including the essentially simultaneously illumination of the reflective surface of switch 10 and the angle correlation of angle $\theta$ to position the surface of switch 10 parallel to the surface of switch 12, whereby the reflected portion 26 of the pulse is controlled in a carefully determined manner. Switch 10 in this embodiment will be referred to herein as a reflective switch since its function is to cut out of the beam 14 a portion of a selected pulse 20 for determining the length thereof by reflecting a selected portion of the pulse to a spatial measuring means.

Switch 12 is located and oriented with respect to switch 10 so that reflected portion 26 is made incident thereon as indicated in FIG. 3. Control pulse 16 is directed and delayed, in a manner that is described more fully below, to be made incident on switch 12 after only a small portion of the leading section of reflected pulse 26 has passed through switch 12, it being understood that in this embodiment switch 12 is in its transmissive mode until the control pulse 16 impinges on it. Once the control pulse is incident on switch 12, that switch changes from being a window to portion 26 to being a mirror for that pulse portion. Thus, reflected pulse 26 is divided into a sliced portion 28 that has been transmitted through the switch, and a reflected portion 30. The sliced portion is made to have a temporal duration that is much smaller than the reflected portion, in order to protect the measuring means 32 from possibly damaging exposure to an undesirably long pulse, and to make possible a high resolution spatial measurement of pulse length. Sliced portion 28 also is made to be much smaller than characterized pulse 20 in the illustrated example in FIG. 3. Switch 12 is oriented parallel to switch 10, in this embodiment, because the control pulse 16 has been made to impinge on switch 10 at 90 degrees thereto, so that it causes the entire leading edge of reflected pulse portion 26 to be oriented essentially parallel to the surface of switch 10 as it is reflected from it; thus, with the surface of switch 12 being positioned parallel to that of switch 10 the cut portion 28 can be made very thin by also simultaneously illuminating the entire surface of switch 12, thereby affording a high resolution measurement of pulse length as the sliced portion moves to a measuring means 32. Switch 12 will be referred to herein in describing this embodiment as a transmission switch, because it functions to slice a thin leading portion of the reflected pulse 26 for further analysis by transmitting that sliced portion 28 so it can later be used in characterizing pulse 20.

After control pulse 16 actuates switch 10, part of it is transmitted to a re-directing means 34 that includes a suitable conventional reflecting means 35. The reflecting means can include a suitably shaped mirror 35, which can be concave (or can be formed of a plurality of mirrors), which are effective to simply reflect the part of pulse 16 that has passes through switch 10 back toward switch 12. It should be understood that the part of control pulse 16 that is transmitted through switch 10 before that switch becomes fully reflective (due to the inherent delay or rise time in developing its reflective state) will be about 500 femtoseconds in duration, which is adequate to subsequently activate switch 12 when reflected to impinge thereon. Those skilled in the art will also understand that rather than transmitting part of the control pulse through switch 10 and re-directing that part of pulse 16 to activate switch 12, the control pulse in alternative embodiments could be split, e.g. by use of a conventional beam splitter, so that a split portion of the control pulse would be suitably directed to actuate switch 12, without causing that split portion to pass through the switch 10. Such an arrangement is more fully explained below, with reference to FIG. 7. The location and shape of the re-directing means 34 is carefully selected so that the transmitted part of pulse 16 is made to arrive at switch 12 when only a small portion of the leading end of reflected pulse 26 has been transmitted through that switch. This necessarily careful selection of the parameters, such as accurate spacing between the elements, is used to selectively delay the transmitted part of pulse 16 in the FIG. 3 form of the system in a manner that will be better understood from the discussion presented below in conjunction with FIG. 7. At this point, it need only be recognized that the selective delay of transmitted part of control pulse 16 is such that the sliced portion 28 of reflected pulse portion 26 is made very short, to enable a high resolution spatial measure of pulse length.

By further considering FIG. 3, it will be understood that the spatial projection indicated at 36 of sliced pulse portion 28 on a measuring means 32 will be accurately related to the temporal pulselength of test pulse 20. The spatial pulselength of the test pulse is, of course, also related to its temporal pulselength by the value of c, the speed of light. The spatial pulselength of the test pulse is indicated in FIG. 3 by the dimension $L_p$, and extends from the leading corner $C_L$ to the trailing corner $C_T$ of the pulse. The spatial length of the reflected pulse sliced portion 28 on the measuring means 32 is indicated in FIG. 3 by the dimension $L_{30}$ by a known geometric or trigonometric relationship that is dependent on the angle $\theta$, assuming simultaneous illumination of the entire area of switch 10 impinged on by control pulse 16. As can be understood from basic principles of optical reflection, since $\theta=45°$ in the embodiment described with reference to FIG. 3, spatial dimension $L_{30}$ of projected sliced pulse portion 28 is related to dimension $L_p$. Also, dimension $L_{30}$ and $L_E$ (the leading edge of sliced portion 28) are related by the simple geometric relation of the Pythagorean Theorem whereby the temporal pulselength of pulse 20 is related to spatial projection $L_{30}$ according to the following relationship:

$$t_p = L_{30}/((c)(\sqrt{2}))$$

where $L_{30}$=the projected length on measuring means 32 of the spatial pulselength of sliced portion 28; where $t_p$=the temporal pulselength of pulse 20; and c=the speed of light.

As should now be understood by those skilled in the art based on the teaching of this disclosure, switch 10 in the embodiment illustrated in FIG. 3 must be oriented with respect to pulse 20 and actuated by control pulse 16 in a manner such that there will be a known geometric or trigonometric relationship between dimension $L_p$ and dimension $L_{30}$. Since there must be a known relationship between these two dimensions for the effective high resolution measurement of pulse length, the pulselength measurement shown in FIG. 3 and described with reference thereto is the longest pulselength that can be accommodated and precisely measured by the apparatus means and method of the present invention. More specifically, this longest pulselength measurement can be made only if switch 10 is positioned to a diagonal that intersects the leading corner ($C_L$ and the top trailing corner ($C_{TT}$) of a test pulse (20). If the arrangement and actuation of the switch 10 and control pulse 16, in relation to the length of a test pulse (20) is such that less than the pulse length $L_p$ is reflected as the reflected pulse portion 26, an inaccurate indication of pulse length would be shown on measuring means 32. Stated another way, with the present invention the maximum pulse length that can be measured is determined by the reflective surface length of reflection switch (10) and can be represented by the equation $$L_{p(max)}=(0.707)(L_E)$$

where $L_E$ (as seen in FIG. 3) is essentially equal to the diagonal length between the leading corner $C_L$ and the top trailing corner $C_{TT}$ of the test pulse (20). Now to explain how the invention can be used to provide a high resolution measurement of a test pulse that is shorter than that shown in FIG. 3; namely, a pulse that is so short that its leading corner ($C_L$) and trailing top corner ($C_{TT}$) cannot simultaneously be intersected by the plane of reflection switch 10, reference is made to FIG. 4.

Figure 4:
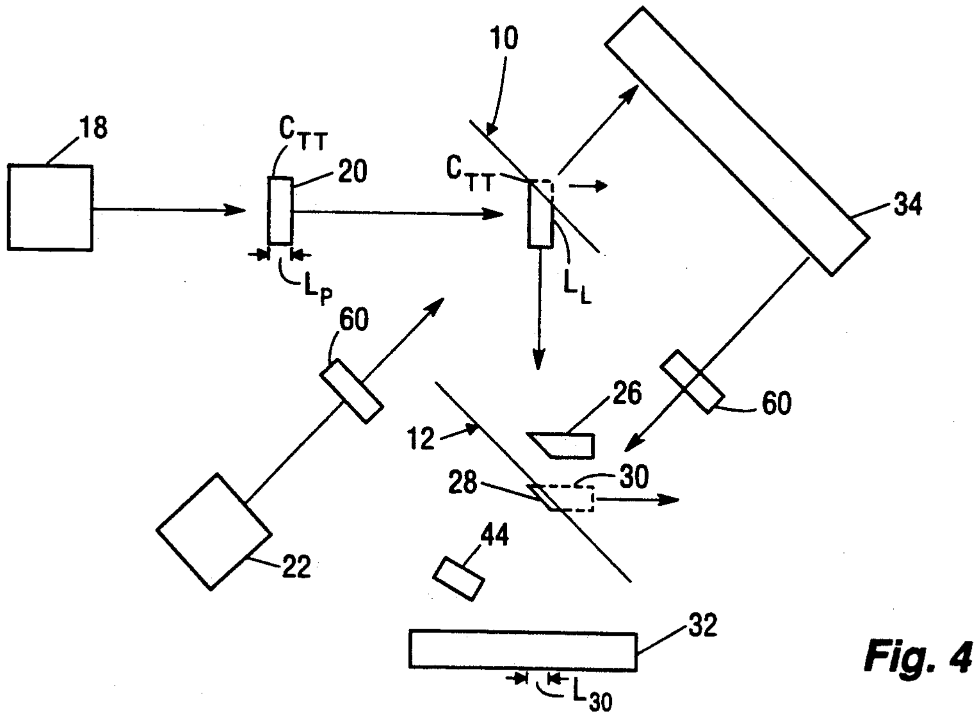
FIG. 4 is a schematic illustrating the system shown in FIG. 3 in conjunction with a shorter duration pulse than that shown in FIG. 3.

The shortest pulselength ($L_p$) that can be measured using the system of the present invention can be determined from an analysis of FIG. 4 in which the switch 10 intersects the top trailing corner $C_{TT}$ (or can intersect any other point on the trailing edge of the pulse) and also intersects the leading edge $L_L$. In general, in FIG. 4 like reference numerals to those used for similar components shown in FIG. 3 are used. Such intersections with the reflection switch surface, as shown in FIG. 4, will produce a known relationship between the projection $L_{30}$ on the measuring means 32 and the temporal pulselength $t_p$ defined earlier in the equation, above. If the above-mentioned 45° switch orientations (as used in FIG. 3) are used, the above-disclosed equation relationship between $L_{30}$ and the temporal pulse length $t_p$ will apply. The shortest pulselength for efficient (i.e. high measurement resolution) slicing with the apparatus means and method of the invention also depends on the reflected pulse portions (26) rise-time.

Figure 5:
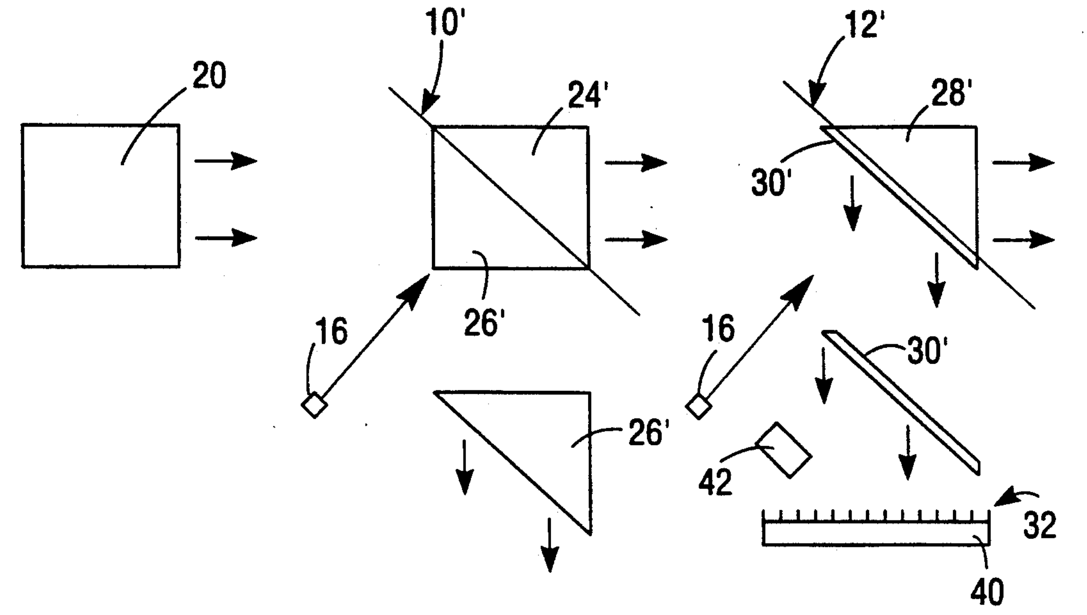
FIG. 5 is a schematic illustrating another mode of operation of the system of the present invention in which the longest pulselength that can be characterized with this form of the system is illustrated.
Figure 6:
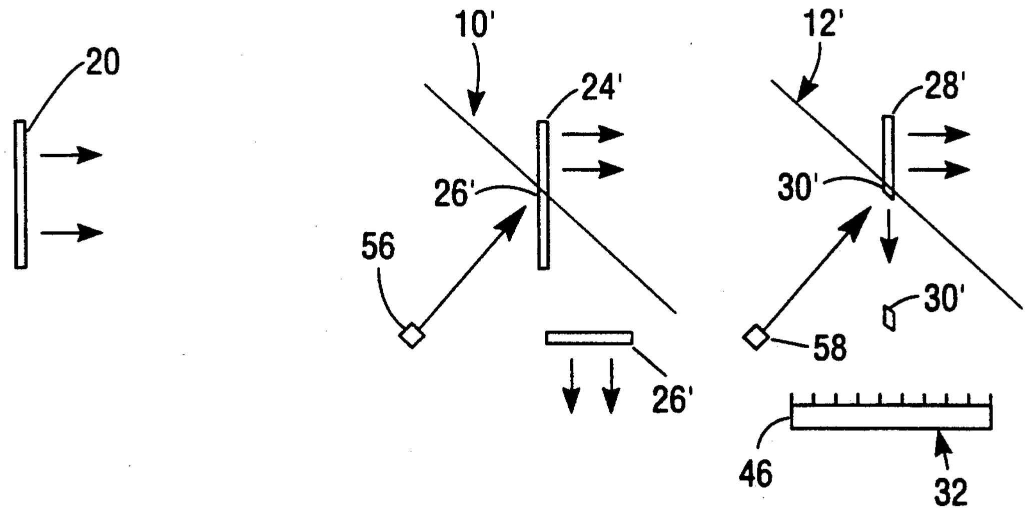
FIG. 6 is a schematic illustrating the system and mode of operation shown in FIG. 5 in conjunction with a shorter duration pulse than that shown in FIG. 5.

The switch configuration shown in FIGS. 3 and 4 has the reflective switch 10 positioned ahead of the transmission switch 12 with respect to the direction of travel of ultra short pulse 20. However, such a configuration is not exclusive of other configurations useful for practicing the invention, and alternative switch set ups are shown in FIGS. 5 and 6 for the longest pulse that can be accurately measured, and for a shorter pulse, respectively, in those Figures. The configurations shown in FIGS. 5 and 6 have the transmission switch 10′ located upstream of the reflective switch 12′ relative to the direction of travel of a test pulse 20. The pulse 20 is cut by operation of the transmission switch to generate a reflected portion 26′ and a transmitted portion 24′. The "prime" notation in FIGS. 5 and 6 is used with the component call-out numbers to indicate that the modes of operation of the switches in FIGS. 5 and 6 is reversed relative to the modes of operation of the related numbering of the switches illustrated in FIGS. 3 and 4. In other words, the transmitted portion 24′ of the pulse incident on switch 10′ is used to characterize the pulselength of pulse 20, in the systems shown in FIGS. 5 and 6, as opposed to the reflected portion of the pulse 26 being used as was done in the systems shown in FIGS. 3 and 4. Similarly, the reflected (or sliced) portion of the pulse 30′ incident on switch 12′ is used for the spatial pulse length measurement in the systems shown in FIGS. 5 and 6, rather than using the transmitted (sliced) portion 28 of the pulse incident on the switch 12 in the systems shown in FIGS. 3 and 4. The transmitted portion 24′ of the pulse is made to be incident on reflective switch 12′ that is operated by a control pulse 16 to reflect a sliced portion 30′ of the pulse 24′ toward a spatial pulse length measuring means 32. The control pulse 16 is generated in the manner discussed above with regard to FIG. 3. Other than reversing the reflection/transmission effects of the switches (10′ and 12′) the theory underlying the systems shown in FIGS. 5 and 6 is identical to that underlying the systems shown in FIGS. 3 and 4.

A further variety of alternative device embodiments of the invention can be used to measure a pulse projection $L_{30}$ such as that shown in FIG. 3. Such alternative devices are represented generally in FIG. 3–6 by the depicted measuring means 32. Measuring means 32 can, for example, include a simple graphite ruler 40, as is illustrated for the means 32 in FIG. 5. Such a ruler is visually observed, or it can be monitored by a camera 42, as shown relative to the measuring means 32 in FIG. 5, such as a suitable conventional CCD (charge coupled device) camera, an Electrophysics 5400-00Z pyroelectric camera read by a Spiricon LBA-100 Laser Beam Analyzer, or the like, or by an infrared camera 44 as is shown in relation to the measuring means 32 in FIG. 4. The measuring means 32 can, alternatively, be a pyroelectric detector array 46, as is schematically illustrated in FIG. 6. A suitable pyroelectric detector array for such a usage is a commercially available Model B10R-40 Belov Technology HgCdTe detector array.

Figure 7:
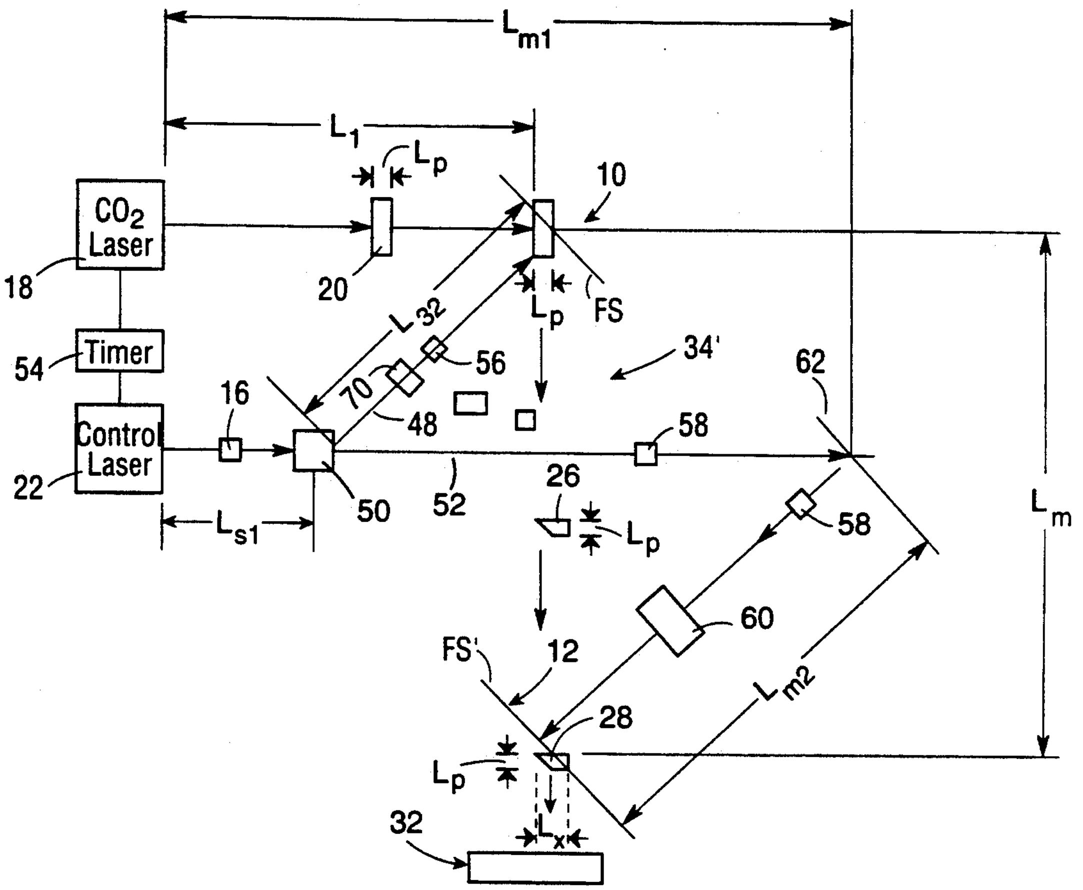
FIG. 7 is a schematic illustrating one form of the system of the invention, which includes mirrors used as a means for directing and delaying control pulses for operating and sequencing the operation of the reflection switches of the system in a desired manner.

One preferred embodiment of a suitable control pulse directing means 34′ for directing and delaying the control pulse 16 is shown in FIG. 7 in conjunction with the switches 10 and 12. In FIG. 7 switches 10 and 12 operate in the respective reflective and transmissive modes analogous to similarly numbered switches 10 and 12 illustrated in FIG. 3. The illustrated directing means 34′ includes a suitable conventional beam splitter 50, such as a conventional NaCl wedged beam splitter, a mirror 62 and a suitable timing means such as depicted timer 54. The directing means both directs and appropriately delays control pulse 16 to cause a first split part 56 on path 48 to arrive at reflective switch 10 after a predetermined portion of the test pulse 20 is transmitted through switch 10, thereby to cause the switch 10 to reflect a pulse portion 26 of that pulse 20 toward switch 12. Then, the directing means is further effective to cause a second split part 58 of the control pulse, on path 52 to arrive a transmission switch 12 when a desirably small sliced portion 28, such as 10% of the reflected pulse portion 26, has passed through that switch 12. It should be observed that if a sliced portion 28 of the reflected pulse is made to be smaller than the just-mentioned 10% for use as a projected spatial pulse length to measured pulse 20, higher measurement resolutions can be obtained. Therefore, the 10% value is to be taken as being a representative example only, and is not intended to be limiting.

First laser 18 and control laser 22 are timed with the same source to allow the synchronization necessary for practicing the invention, therefore, timing means 54 is used as such a common timing source for controlling lasers 18 and 22 in the preferred embodiment shown in FIG. 7. The pulse discharge of control laser 22 is synchronized with the pulse discharge of first laser 18 by the timing means 54 that is operably connected to the two lasers in a suitable conventional manner, thereby to properly sequence the triggers for the Pockel's cell of a regenerative amplifier in laser 22, and the thyratrons of an oscillator in laser 18. One suitable form of the timing means 54 is a Model DG535 Digital Delay Generator, which is commercially available from Standard Reserve Systems Corp. Beam splitter 50 directs a first portion of the control pulse 56 along path 48 toward switch 10 to be incident on that switch at about 90° to the plane containing the reflective surface FS thereof, and directs a second control pulse portion 58 along path 52 toward a mirror 62. The mirror 62 is arranged to re-direct control pulse portion 58 toward switch 12 at about a right angle to the plane containing the reflecting surface FS' thereof.

As discussed above, first control pulse portion 56 is controlled and delayed to impinge on reflective switch 10 when test pulse 20 is sufficiently far through switch 10 so its leading and trailing ends intersect the switch. And, control pulse portion 58 is controlled and delayed to impinge on the transmission switch 12 when about 10% (or less) of the reflected pulse portion 26 has passed through switch 12. The delays are partially effected by timing means or mechanisms 54, and are completed by suitably adjusting the respective optical distances between the respective lasers and the switches in the manner explained above in the discussion relating to the FIG. 3 embodiment.

By way of example, the necessary control pulse transmission delays can be set so pulse portion 56 reaches switch 10 when pulse 20 is approximately half way (as illustrated) through the switch by setting the respective spatial distances between first laser 18, switch 10, and that between control laser 22 and switch 10 according to the following relationship, using the dimensions designated in FIG. 7 (which are not shown to scale):

$$\frac{L_1}{c} + \frac{t_p}{2} = \frac{L_{s1} + L_{s2}}{c}$$

where:

$L_1$ = the distance between laser 18 and the first point on switch 10 to be impinged on by pulse 20;

$L_{s1}$ = the distance between control laser 22 and beam splitter 50;

$L_{s2}$ = the distance between the beam splitter 50 and surface plane FS of switch 10;

c = the speed of light; and $t_p$ = the temporal pulselength of the ultra short laser pulse 20.

The path length of the control pulse portion 56 is adjusted so the control pulse portion 56 arrives at switch 10 when a desired amount of pulse 20 has passed through that switch. Such a preselected delay can be effected by adjusting the distances in the manner discussed above and by having timer mechanism 54 made to activate both lasers either simultaneously or at a predetermined interval. As will be discussed below, the path length adjustment is used to delay control pulse portion 58 to arrive at switch 12 when a predetermined portion of reflected pulse portion 26 has been transmitted through that switch. Again, if the timing mechanism 54 is set to activate both lasers simultaneously, the path lengths discussed herein will be made effective to delay the control pulse portions (56 and 58) sufficiently to cause them to arrive at the desired switches at the proper times.

Control pulse portion 58 is delayed by the directing and delaying means 34' shown in FIG. 7 to reach switch 12 when 10% of reflected pulse portion 26 has passed through that switch (90% of pulse portion 26 is reflected) by setting the distances between control laser 22, mirror 62 and switch 12; and by setting the distances between the two switches 10 and 12 and between the first laser 18 and switch 10 according to the following relationship:

$$\frac{L_{m1} + L_{m2}}{c} = \frac{L_1}{c} + \frac{t_p}{2} + \frac{L_m}{c} + \frac{0.1t_p}{2}$$

where $L_{m1}$ = the distance between laser 18 and the point on mirror 62 that is impinged by the middle of pulse portion 58;

$L_{m2}$ = the distance between mirror 62 and the plane of surface FS' of switch 12;

$L_1$ = the distance between laser 18 and the first point on switch 10 to be impinged on by pulse 20; and $L_m$ = the distance between the respective points on switches 10 and 12 that are respectively impinged on by the mid-points of pulse 28 and reflected pulse portion 26.

The relationships disclosed above can also be scaled if such scaling is found to be suitable for certain applications. Furthermore, if desirable in selected applications of the invention, suitable beam shaping and controlling elements, such as a conventional polarizer 60 (shown in FIG. 7) and/or suitable conventional beam width controlling lenses 70 (shown in the control pulse path 48 in FIG. 7) can be used to shape and further control the switch control pulse portions 56 and 58, for example.

Figure 8:
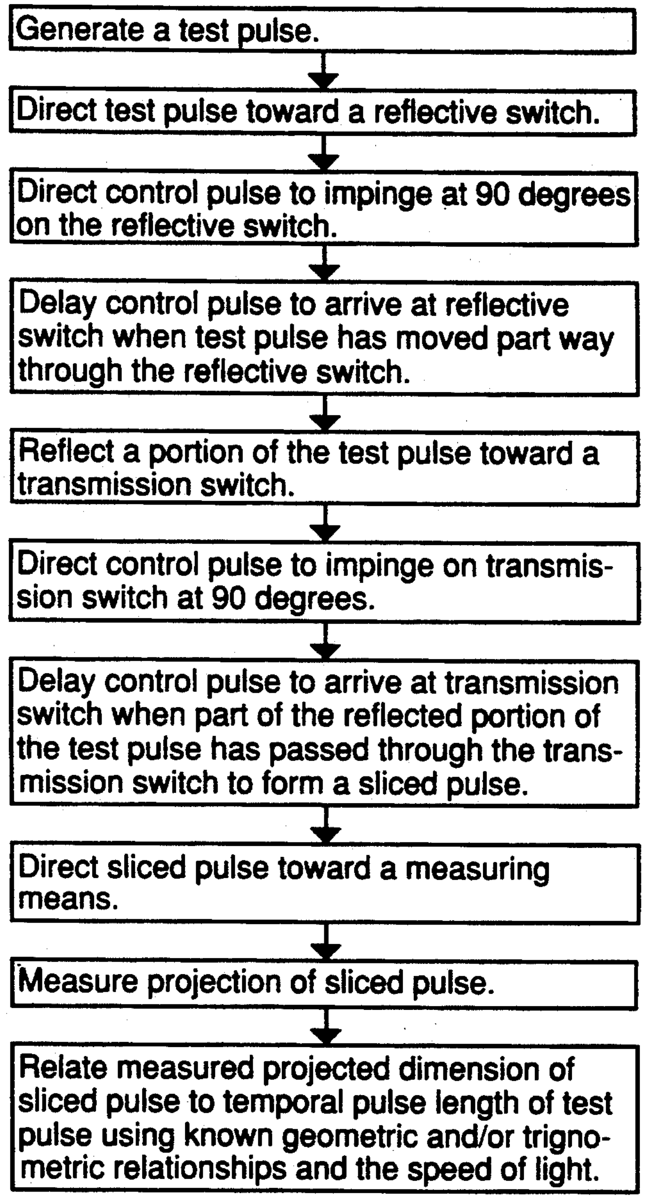
FIG. 8 is a flow chart illustrating the method of the present invention for characterizing high power, ultrashort laser pulses.

The preferred arrangement of the method for characterizing a pulse to determine its pulse length, according to the present invention, is shown in FIG. 8. The method includes the steps of generating an ultra short test pulse, such as the pulse 20 described above, which is to be characterized. (In the remainder of the description of the method steps reference numbers will be used in parentheses to designate the general types of apparatus components that can be used to practice the method, as such components are identified by like numbers in the foregoing description of the apparatus means of the invention; however, the method steps may be practice using suitable alternative apparatus components.) The next step of the method includes directing the pulse toward a reflective switch (10), generating a control pulse (16) and directing and delaying that control pulse to cause it to move toward the reflective switch, and arrive at that switch and impinge at about a 90° angle on that switch when the test pulse has moved a predetermined distance through the switch. The method further includes the step of reflecting a portion of the test pulse that has not passed through the reflection switch (10) when the control pulse impinges on that switch (10) and directing that reflected pulse portion toward a transmission switch (12). The method further includes directing a control pulse toward the transmission switch and delaying the arrival of that control pulse to impinge on the transmission switch at about a 90° angle when only a predetermined small part of the reflected portion of the test pulse has moved through the transmission switch (12). The preferred arrangement of the method is made effective to allow approximately 10% of the reflected portion of the test pulse to pass through the transmission switch before the control pulse impinges on that switch to change it from a window to a mirror. The small portion of the reflected test pulse portion that has passed through the transmission switch (12) is sliced off when the control pulse impinges on that switch. The sliced off part of the reflected portion of the test pulse then is caused to impinge on a provided measuring means that is effective for measuring the spatial length dimension of a projection of that sliced off part of the reflected test pulse portion. Finally, if desired in practicing the method, the measured spatial length dimension is related to the temporal pulselength dimension of the ultra short pulse being characterized according to known geometric and trigonometric relationships, by using principles and such as the Pythagorean Theorem or the like, and by the formulas noted above for determining $t_p$.

As can be understood from the foregoing, the method of the present invention can be carried out in real time, and on line, for every test pulse in a monitored system or beam of pulses.

While certain forms of the present invention have been illustrated and described herein, the scope of the invention is not to be limited to the specific forms or arrangements of parts described and shown, but rather is defined by the following claims.

I claim:

1. Apparatus means for characterizing the pulse length of an ultra short laser pulse comprising:

a) a first laser that is operable to generate an ultra short duration laser pulse in the order of 30 ps or less;

b) a control laser for generating a control pulse;

c) a reflective switch located to receive said laser pulse and said control pulse, said reflective switch being normally transparent to said laser pulse and being changed to a reflector of said laser pulse when said control pulse is impinged on said reflective switch, said reflective switch being located with respect to said control laser to receive said control pulse when said laser pulse is incident on said reflective switch and has passed part of its length through said reflective switch thereby to pass a portion of said incident laser pulse through said reflective switch and to reflect the remaining portion of said incident laser pulse and skew it with respect to the initial direction of said laser pulse whereby spatial physical measurements can be made on said reflected portion of said incident laser pulse;

d) a transmission switch located to receive said reflected portion of said incident laser pulse, said transmission switch being normally transparent to said reflected portion and being made to change to a reflector of said reflected portion when said control pulse is incident on said transmission switch, said transmission switch being located with respect to said control laser to receive said control pulse after said reflected portion is made incident on said transmission switch and has passed part way through said transmission switch, thereby to pass a portion of the length of said reflected portion of said incident laser pulse through said transmission switch and to reflect the remaining portion of said reflected portion, whereby said portion passed through said transmission switch is sliced from the remaining portion of said reflected portion so that only the sliced portion passes through the transmission switch;

e) directing means directing said control pulse onto said transmission switch and delaying said control pulse to be incident on said transmission switch after the sliced portion of said reflected portion of the laser pulse has passed through said transmission switch; and f) measuring means located so that said sliced portion is made incident thereon for measuring the physical pulselength of said sliced portion, said physical pulselength being readily convertible into a temporal pulselength of said laser pulse.

2. The means defined in claim 1 wherein said directing means includes optical means for focusing said control pulse on said transmission switch.

3. The means defined in claim 2 wherein said optical means includes a beam splitter and a mirror, with the beam splitter being arranged to cause a split portion of the control pulse to impinge on said mirror which reflects the impinging split control pulse to impinge on said transmission switch.

4. The means defined in claim 1 directing means includes a beam splitter, a mirror and timing mechanism connected to said first laser and to said control laser, with said beam splitter and said first reflection switch being arranged relative to the first laser and the control laser according to the relationship:

$$\frac{L_1}{c} + \frac{t_p}{2} = \frac{L_{s1} + L_{s2}}{c}$$

where $L_1$=the distance between said first laser and said first reflection switch;

$L_{s1}$=the distance between the control laser and the beam splitter;

$L_{s2}$=the distance between the beam splitter and the first reflection switch;

$t_p$=temporal pulselength of said laser pulse; and c=the speed of light.

5. The means defined in claim 4 wherein said mirror, said beam splitter, said control laser, said first laser, said first reflection switch, and said transmission switch being located with respect to each other according to the relationship:

$$\frac{L_{m1} + L_{m2}}{c} = \frac{L_1}{c} + \frac{t_p}{2} + \frac{L_m}{c} + \frac{0.1t_p}{2}$$

where $L_{m1}$=the distance between said first laser and said mirror;

$L_{m2}$=the distance between said mirror and said transmission switch;

$L_1$=the distance between the first laser and first reflection switch; and $L_m$=the distance between the first reflection switch and the transmission switch.

6. The means defined in claim 2 wherein said measuring means includes a spatial measuring means selected from a group containing a graphite ruler, a pyroelectric detector array, an infrared camera, or a CCD camera.

7. The apparatus means defined in claim 1 wherein said laser pulse contains a leading corner and a trailing corner, and wherein said reflective switch is oriented at about a 45° angle with respect to said laser pulse, and wherein said transmission switch is oriented about parallel to said reflective switch.

8. The apparatus means defined in claim 7 wherein said first reflection switch includes a germanium plate and said transmission switch includes a Germanium plate, and wherein said control pulse is directed to have about a 90° angle of incidence with said first reflection switch, and said control pulse is directed to have about a 90° angle of incidence with said transmission switch.

9. The means defined in claim 1 wherein said control pulse has a wavelength in the order of 1.06 μm or less.

10. A method of characterizing short laser pulses comprising:

a) generating a laser pulse having a wavelength in the order of about 10 μm or less and a duration of less than 30 ps;
b) generating a control laser beam;
c) directing the laser pulse and the control laser beam at a first reflection switch;
d) timing the control laser beam to be incident on the first reflection switch after a portion of the laser pulse has passed part way through the first reflection switch, thereby to reflect a remaining portion of the laser pulse and to skew it from the initial direction of the laser pulse in a predetermined manner;
e) locating a second reflection switch to receive the reflected portion of the laser pulse;
f) directing the control laser beam to be incident on the second reflection switch when the reflected portion of the laser pulse has passed part way through the second reflection switch to pass a transmitted or sliced portion of said reflected portion through the second reflection switch;
g) locating a measuring means to receive said transmitted or sliced portion;
h) measuring said transmitted or sliced portion to determine a physical length measurement that is convertible into a temporal pulselength of the laser pulse.

11. The method defined in claim 10 wherein said step of generating a laser pulse includes generating a laser pulse having a leading corner and a trailing corner, and wherein said step of timing the control laser beam to be incident on the first reflection switch after a portion of the laser pulse has passed part way through the first reflection switch includes the timing the control laser beam to be incident on the first reflection switch after the laser pulse has passed through the first reflection switch far enough so that said leading corner and said trailing corner will be in the reflected portion, but no other corners of the laser pulse will be in the reflected portion.

12. The method defined in claim 11 wherein said step of directing the laser pulse and the control laser beam at a first reflection switch includes orienting the first reflection switch so the laser pulse has about a 45° angle of incidence with respect to the first reflection switch, and wherein said step of locating a second reflection switch to receive the reflected portion of the laser pulse includes a step of orienting the second reflection switch to be about parallel to the first reflection switch.

13. The method defined in claim 10 wherein said step of directing the control laser beam to be incident on the second reflection switch when the reflected portion of the laser pulse has passed part way through the second reflection switch includes splitting the control laser beam so a first portion of the control laser beam is directed to the first reflection switch and a second portion of the control laser beam is directed to the second reflection switch, and said step of directing the control laser beam to be incident on the second reflection switch when the reflected portion of the laser pulse has passed part way through the second reflection switch includes locating a mirror to receive the control laser beam, said mirror being oriented to direct a reflected portion of the control laser beam to be incident on the second reflection switch.

14. The method defined in claim 10 wherein said step of timing the control laser beam to be incident on the first reflection switch after a portion of the laser pulse has passed part way through the first reflection switch includes locating a beam splitter between a laser generating the control laser beam and the first reflection switch and locating the laser generating the control laser beam with respect to the beam splitter, with respect to the first reflection switch and with respect to a laser generating the laser pulse according to the relationship:

$$\frac{L_1}{c} + \frac{t_p}{2} = \frac{L_{s1} + L_{s2}}{c}$$

where $L_1$ = the distance between a laser generating the laser pulse and the first reflection switch;
$L_{s1}$ = the distance between the control laser and the beam splitter;
$L_{s2}$ = the distance between the beam splitter and the first reflection switch;
$t_p$ = temporal pulselength of said laser pulse; and
C = the speed of light.

15. The method defined in claim 14 wherein said step of directing the control laser beam to be incident on the second reflection switch when the reflected portion of the laser pulse has passed part way through the second reflection switch includes locating a mirror between the beam splitter and the second reflection switch and locating the control laser, the beam splitter, the mirror, the second reflection switch, the laser generating the laser pulse, and the first reflection switch with respect to each other according to the relationship:

$$\frac{L_{m1} + L_{m2}}{c} = \frac{L_1}{c} + \frac{t_p}{2} + \frac{L_m}{c} + \frac{0.1t_p}{2}$$

where
$L_{m1}$ = the distance between the laser generating the laser pulse;
$L_{m2}$ = the distance between the mirror and the second reflection switch; and
$L_m$ = the distance between the second reflection switch and the first reflection switch.

16. A method of characterizing high power, ultra short laser pulses in a real time, on line manner comprising steps of:

a) generating a high power, ultra short laser pulse;
b) positioning a first reflection switch to have the ultra short laser pulse incident thereon, the first reflection switch transmitting the ultra short laser pulse;
c) generating a control laser pulse;

d) directing the control laser pulse to be incident on the first reflection switch at an angle of about 90° with respect to the first reflection switch when the ultra short laser pulse has passed part way through the first reflection switch, the control laser pulse causing the first reflection switch to change from transmitting the ultra short laser pulse to reflecting the ultra short laser pulse to cut off the portion of the ultra short laser pulse that has passed through the first reflection switch when the control pulse is incident on the first reflection switch and to reflect a portion of the ultra short laser pulse that has not passed through the first reflection switch when the control laser pulse is incident on the first reflection switch, thereby to define a reflected pulse;

e) directing the reflected pulse toward a second reflection switch located spaced apart from the first reflection switch;

f) directing the control laser pulse to be incident on the second reflection switch at an angle of about 90° when the reflected laser pulse has passed part way through the second reflection switch, the control laser pulse causing the second reflection switch to change from transmitting the reflected laser pulse to reflecting the reflected laser pulse, thereby to cut off the portion of the reflected laser pulse that has passed through the second reflection switch when the control pulse is incident on the second reflection switch and to reflect a portion of the reflected laser pulse that has not passed through the second reflection switch when the control laser is incident on the second reflection switch to define a sliced pulse;

g) directing the sliced pulse towards a measuring means; and h) measuring the spatial dimension of the sliced pulse.

17. The method defined in claim 16 further including a step of relating the spatial dimension of the sliced pulse to the temporal length of the ultra short laser pulse.

18. The method defined in claim 17 further including a step of orienting the second reflection switch to be about parallel with the first reflection switch.

19. A method of characterizing short laser pulses comprising:

a) generating a short laser pulse having a temporal pulselength to be characterized;

b) generating a control laser beam;

c) converting the short laser pulse temporal pulselength into a physical pulselength by sequentially focusing the short laser pulse onto two reflection switches and focusing the control laser beam onto the two reflection switches in timed relation with the short laser pulse to impinge on each of the reflection switches at about a 90° angle of incidence, thereby to permit a portion of the laser pulse incident on either of the reflection switches to pass through that reflection switch prior to the control laser beam impinging on that reflection switch and to reflect any remaining portion of the laser pulse; and d) physically measuring the physical pulselength of any portion of the laser pulse transmitted by the second reflection switch of the two reflection switches.

* * * * *